United States Patent
Wendling

(10) Patent No.: US 9,648,650 B2
(45) Date of Patent: May 9, 2017

(54) PAIRING OF DEVICES THROUGH SEPARATE NETWORKS

(71) Applicant: NAGRAVISION S.A., Cheseaux-sur-Lausanne (CH)

(72) Inventor: Bertrand Wendling, Divonne-les-Bains (FR)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 356 days.

(21) Appl. No.: 14/323,455

(22) Filed: Jul. 3, 2014

(65) Prior Publication Data

US 2015/0009916 A1 Jan. 8, 2015

(30) Foreign Application Priority Data

Jul. 4, 2013 (EP) .................................... 13175183

(51) Int. Cl.
*H04W 76/02* (2009.01)
*H04N 21/41* (2011.01)
(Continued)

(52) U.S. Cl.
CPC ....... *H04W 76/021* (2013.01); *H04L 61/2007* (2013.01); *H04N 21/4126* (2013.01); *H04N 21/4367* (2013.01); *H04W 8/005* (2013.01)

(58) Field of Classification Search
CPC ............... H04W 76/021; H04W 8/005; H04N 21/4126; H04N 21/4367; H04L 61/2007
See application file for complete search history.

(56) References Cited

U.S. PATENT DOCUMENTS

| 2001/0021884 | A1 | 9/2001 | Shinyagaito |
| 2005/0210238 | A1 | 9/2005 | Takita et al. |

(Continued)

FOREIGN PATENT DOCUMENTS

| EP | 1 133 120 | 9/2001 |
| EP | 1 557 999 | 7/2005 |
| WO | WO 03/051024 | 6/2003 |

OTHER PUBLICATIONS

European Search Report issued in EP 13 17 5183, dated Dec. 4, 2013.

*Primary Examiner* — Edan Orgad
*Assistant Examiner* — Jeremy Costin
(74) *Attorney, Agent, or Firm* — DLA Piper LLP (US)

(57) ABSTRACT

A method for pairing a multimedia receiver connected to an IP network with at least one mobile equipment connected to a mobile network using a communication protocol different from the IP network. A unique identifier of the mobile equipment is introduced into an application on the multimedia receiver. The latter transmits, to the mobile equipment, a message comprising a pairing request and a command for acquiring a unique public address of the multimedia receiver, said mobile equipment being identified by an address associated to the unique identifier. The mobile equipment receives the message and transmits a response message to the multimedia receiver identified by the unique public address, said response message comprising unique identifier. The multimedia receiver verifies the unique identifier in the response message by comparing it with the unique identifier introduced into the application. If the verification is successful, the mobile equipment pairs with the multimedia receiver.

18 Claims, 1 Drawing Sheet

(51) Int. Cl.
*H04L 29/12* (2006.01)
*H04N 21/4367* (2011.01)
*H04W 8/00* (2009.01)

(56) References Cited

U.S. PATENT DOCUMENTS

| | | |
|---|---|---|
| 2006/0107299 A1 | 5/2006 | Bartfeld et al. |
| 2006/0155653 A1 | 7/2006 | Persokrud et al. |
| 2009/0298535 A1 | 12/2009 | Klein et al. |
| 2009/0325491 A1 | 12/2009 | Bell et al. |
| 2010/0332829 A1* | 12/2010 | Baroffio ............... G06F 21/554 713/168 |
| 2011/0137948 A1* | 6/2011 | Davis ................. G06F 17/3002 707/792 |
| 2011/0273625 A1* | 11/2011 | McMahon ............ G06F 21/445 348/734 |
| 2012/0096503 A1 | 4/2012 | Slothouber et al. |
| 2012/0159546 A1 | 6/2012 | Klein et al. |
| 2012/0322384 A1* | 12/2012 | Zerr ..................... H04L 67/303 455/41.3 |
| 2012/0324076 A1 | 12/2012 | Zerr et al. |
| 2013/0086618 A1 | 4/2013 | Klein et al. |
| 2014/0181886 A1* | 6/2014 | Goodman ......... H04M 3/42042 725/133 |

\* cited by examiner

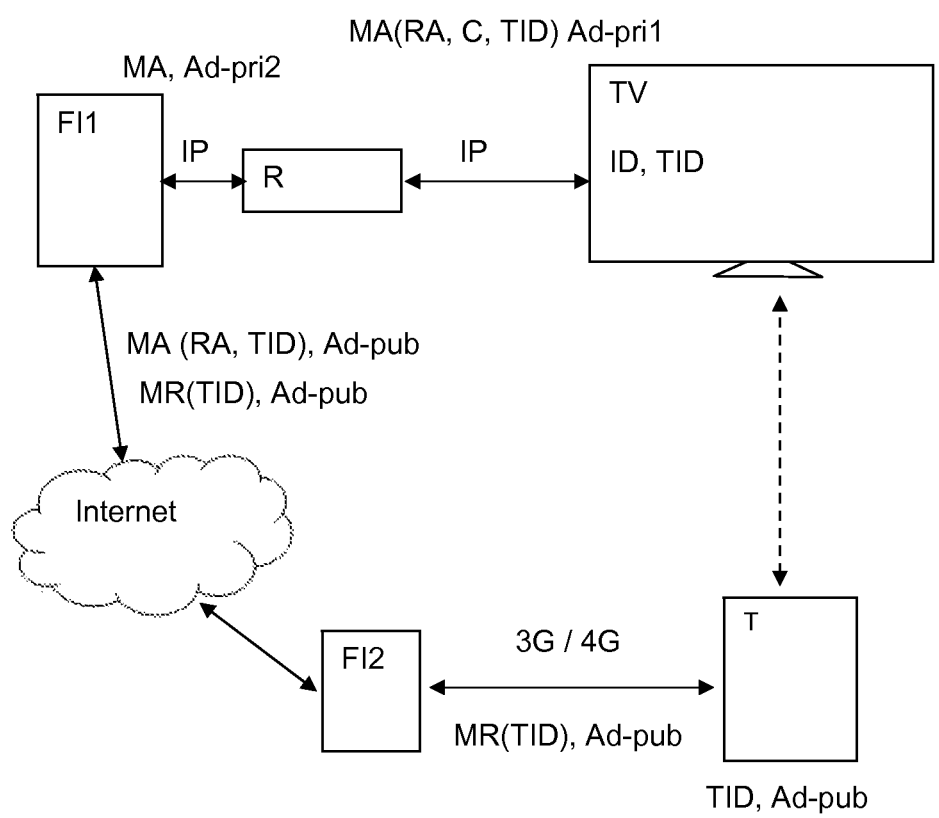

PAIRING OF DEVICES THROUGH SEPARATE NETWORKS

CROSS REFERENCE TO RELATED APPLICATIONS

This application claims priority under 35 U.S.C. §119 to European Patent Application No. 13175183, filed Jul. 4, 2013, the entire contents of which are hereby incorporated by reference herein.

FIELD

The present invention relates to a method for pairing at least two devices, each device being connected to a respective communication network which differs by its nature and its communication protocol.

TECHNICAL BACKGROUND

Electronic apparatuses or devices, such as mobile phones, personal digital assistants (PDA), portable personal computers, tablets, and digital television sets, etc. generally have communication functions on Internet and can also communicate each other via wired or wireless network. In particular, such intelligent electronic devices are personalized according to user's characteristics and to network environments between devices. For example, smartphones mainly offer personalized Internet services.

The digital television set also allows a user to access Internet thanks to an integrated browser or by means of an Internet compatible external device connected to the television set. Several solutions for forming personalized connections of mobile devices to television sets or to multimedia receivers like decoders are described in the prior art, for example:

The document US 2006/0155653 A1 describes a dynamic authentication system for digital television comprising a mobile phone used by a user in connection with a digital television receiver. The mobile phone is configured for sending and receiving short messages SMS. The television receiver includes a tamper-proof security module in form of a smart card configured for generating a dynamic authentication code to be displayed on the screen of the television receiver. The user reads the authentication code and introduces it in the mobile phone. This authentication code and specific application data are transmitted by SMS to an application server using an authentication code validation system. If this authentication code is accepted, the required service is granted to the user.

The document US 2012/0324076 A1 describes systems and methods for associating or pairing a mobile device with an output device included in an interactive system. More particularly, the mobile device comprising a mobile application is registered with a mobile connection server. In order to activate the pairing, the user introduces a request for a pairing code via the interactive system. In response to the request, the mobile connection server returns a pairing code, which will be displayed by the output device. The user then introduces the pairing code in the application of the mobile device. The mobile application sends the introduced pairing code back to the mobile connection server. In response to a correspondence between the pairing code provided to the interactive system for the output to the user and the pairing code introduced into the user's mobile device and provided to the mobile connection server, the mobile device is paired to the interactive system. The user can then interface with the interactive system by using the mobile device. Furthermore, the user can access personalized contents, order other available contents, and/or authorize a payment for contents or services.

The document WO 03/051024 A2 describes a decoding system for encoded services comprising: a decoder to decode encoded services connected to a monitor, control means cooperating with the decoder and carrying out a service application of text messages for formatting input data into a text message, means for transmission of the text message, and means for reception and display on the monitor of a received text message. The text message service can be a short message service (SMS) allowing a user to send and receive a short message via telecommunication systems such as the GSM mobile system or via a modem on a telephone line. In certain embodiments, the device can be housed in only one box or set top box. The user uses an infrared remote control to enter the short message to be transmitted, which is displayed on the screen of the monitor.

The document US 2012/096503 A1 describes a system and a method to supply support services to client equipment using a service infrastructure based on the IP protocol (Internet Protocol). According to one embodiment, a gateway server is coupled to an IP compatible device via an IP network. The gateway server can supply Internet services to a support application running on the IP device. The Internet services define a set of functions, which can be supported by the client equipment. These functions are managed by a client support application running on the client equipment by supplying an access to certain material and software functions of the client equipment. Besides Internet services, the gateway server can supply network management services which activate or deactivate the pairing of the IP device with the appropriate target client equipment. The gateway server can also authenticate the devices, manage the network resources and carry out the secure transmission of messages between the IP device and the target client equipment. Furthermore, the gateway server can supply a message routing and a relay function which can forward the messages towards one or more distribution and routing servers which cooperate to define a path through the IP network for transmitting the messages between the paired devices.

Generally a pairing between a companion device and a receiver/decoder or a television set can be easily carried out when these devices are connected to the same home network. However, mobile telephones or tablets can be connected to separate networks, as for example the television set is connected to a DSL (Digital Subscriber Line) network with IP protocol while the mobile phone is connected to a mobile 3G (UMTS) or 4G (LTE) network or other wireless mobile network. In this case, a pairing cannot be achieved in a simple way by a devices discovery using protocols specific to the home network, because the mobile phone connected to a particular 3G or 4G network will be not visible on the home network.

BRIEF DESCRIPTION

Described herein is a simple solution for pairing between a multimedia receiver connected to a IP type network (Internet Protocol) and at least one mobile equipment connected to a second type of network such as a 3G/4G broadband mobile network or other type of network.

A method for pairing a multimedia receiver connected to an IP communication network with at least one mobile equipment connected to a mobile communication network using a communication protocol different from the protocol of the IP network, the method is characterized in that it comprises following steps:

introducing a unique identifier of the mobile equipment in an application associated to a communication interface with the IP network of the multimedia receiver, transmitting, by the multimedia receiver, a message to the mobile equipment, the message comprising at least one pairing request and a command for acquiring a unique public address of the multimedia receiver on the IP network, said mobile equipment being identified by an address associated to the unique identifier, receiving the message, by the mobile equipment, and transmitting a response message to the multimedia receiver identified by the unique public address previously acquired, said response message comprising at least the unique identifier of the mobile equipment, verifying, by the multimedia receiver, the unique identifier of the mobile equipment received by the response message by comparison with the unique identifier previously introduced into the application of the communication interface with the IP network, if the verification is successful, establishing the pairing between the mobile equipment and the multimedia receiver, the mobile equipment forming a companion device of the multimedia receiver able to exchange data with said multimedia receiver.

The proposed solution consists of introducing a unique personal identifier, for example a phone number or an e-mail address, into an application installed in a multimedia receiver such as a digital television decoder or a television set comprising an Internet communication module. The application is designed for initializing a pairing based on the unique personal identifier, i.e. associating the multimedia receiver with a mobile equipment connected to the mobile network services by using the public IP address of said multimedia receiver. Generally speaking, the multimedia receiver transmits a message in form of an e-mail or a short message (SMS) to the mobile equipment in which a suitable application provides an address forming a link and identification parameters necessary for a secure and authenticated piracy-proof connection.

Thanks to this method, it is no longer necessary to use a home network with a specific protocol for discovering devices involving a risk of unwanted connection of unauthorized neighboring devices.

BRIEF DESCRIPTION OF THE DRAWING

The following detailed description will be better understood with reference to the annexed drawing, which is given as a non-limitative example.

FIG. 1 shows a block diagram representing a multimedia receiver connected to an IP type network paired with a mobile equipment connected to a 3G/4Gmobile network.

DETAILED DESCRIPTION

Referring to FIG. 1, a multimedia receiver TV can be constituted by a television set, a receiver/decoder locally connected to a television set, a personal computer or another multimedia unit comprising a display screen and an IP interface allowing an Internet connection, for example via a router R connected to a remote server FI1 of an Internet service provider. The connection between the multimedia receiver TV and the router R can be made by means of a cable or a wireless WiFi connection. Other devices can also be connected to the router R by forming a local network where the router R plays the role of a gateway towards the Internet provider's server FI1. The router R can also be formed by a local server of a local network (LAN/WLAN) managing a plurality of devices.

The mobile equipment T is preferably in form of a smartphone, tablet or personal assistant including a display, a communication module to a mobile network of 3G or 4G type, or another mobile network with high data rate or broadband able to establish a connection to Internet services.

During an initialization phase, a user introduces, by means of a remote control, keyboard, or any other pointing device, a unique personal identifier TID into an application installed in the multimedia receiver TV associated to the interface for communication with the IP network. This identifier TID preferably consists of a phone number, an e-mail address or any other identifier allowing uniquely recognizing the user of the mobile equipment T in the mobile network. The application, activated by the user, composes a message MA containing at least one pairing request RA and a command C allowing recording a unique public address Ad-pub of the multimedia receiver TV in the IP network. The final message MA transmitted by the IP network to the mobile equipment T comprises the pairing request RA, the unique public address Ad-pub of the multimedia receiver TV and the address of the mobile equipment including its identifier TID in form of a phone number or an e-mail address.

An IP address is assigned to each interface with the network of every computer device (router, computer, ADSL modem, network printer, etc) connected to a network using the IP protocol to communicate with the different devices. This IP address is assigned either individually by an administrator of a local network (in general a fixed IP address), or automatically via the DHCP (Dynamic Host Configuration Protocol) protocol. If a computer of the network has several interfaces, each one has a specific IP address. One interface can also have several IP addresses.

The data transmission using the IP protocol is carried out by packets containing each the IP address of the sender as well as the IP address of the recipient. The IP routers forward the data packets towards destination, step by step, via one or more intermediate interfaces each having their own IP address.

According to a configuration example, the multimedia receiver TV, when transmitting a request towards the Internet network, uses a first non unique private IP address Ad-pri1 to forward the request towards a router R DSL (Digital Subscriber Line) which has a private IP address Ad-pri2. The router R also uses this private address Ad-pri2 to forward the request towards a server FI1 of an Internet service provider in the IP network. This server FI1 converts the private IP address of each packet received from the router R into a unique address corresponding to a specific user listed in a database of the server FI1 before retransmitting the data towards a final recipient. This unique address is called public address as it can be made available to any recipient chosen by the user, in this case, a mobile equipment T to be paired with the multimedia receiver TV.

An IP address of a computer at a local level is called private, like the addresses of interfaces used for the transmission of the packets towards an Internet server.

The IPv4 (IP version 4) addresses are called public if they are registered and routable on the Internet, they are thus unique worldwide. Inversely, the private addresses can only be used in a local network, and are unique only in this network. The network address translation allows to transform private addresses into public addresses and to access Internet from a computer of a private network.

In an IP network in IPv6 (IP version 6) mode, the addresses are encoded on 16 bytes instead of 4 bytes as for IPv4. This possibility to have a much higher number of addresses allows attributing a unique address to each device connected to the network without having to convert not unique local private addresses into unique public addresses.

When the mobile equipment T receives the message MA, it returns a response message MR regarding the request to the multimedia receiver TV by using the unique public address Ad-pub. This response message MR, containing at least the unique identifier TID of the mobile equipment T, transits through the mobile network 3G/4G via a server FI2 of an Internet service provider on mobile network, by passing by the server FI1 of the IP network which determines the recipient, in this case the multimedia receiver TV, thanks to the unique public address Ad-pub.

Before establishing a pairing, the multimedia receiver TV verifies the unique identifier TID of the mobile equipment T received by the response message MR by comparing it with the identifier previously introduced into the application, which has composed the pairing request message MA.

If the verification is successful, i.e. when the compared identifiers are identical, the pairing between the mobile equipment T and the multimedia receiver TV can be established. This pairing allows to a duly identified mobile equipment T interacting with the multimedia receiver TV. Thus no other mobile equipment can communicate with the multimedia receiver without having carried out the steps of the pairing method. One or more supplementary mobile equipment may also be paired, in condition to introduce the identifier of each of them into the application of the multimedia receiver which composes a message MA addressed to each mobile equipment T.

In the contrary case where the received identifier differs from that registered by the application of the multimedia receiver, the pairing fails and the user may be invited to restart the process by introducing a correct identifier.

A paired mobile equipment T plays a role of a companion device of the multimedia receiver TV by sharing for example the display (companion display) or by exchanging various data, like contents or information supplements, with the multimedia receiver. Each exchanged data packet includes the public address of the mobile equipment and of the multimedia receiver.

Generally, the paired mobile equipment T is located near the multimedia receiver TV, i.e. within a radius of some meters. According to an embodiment, this aspect of proximity of the two devices can be verified in addition to the verification of the identifiers in order to avoid pairing a distant multimedia receiver out of the vision field of the mobile equipment. This verification can for example be done locally by an audible signal emitted either by the multimedia receiver TV or by the mobile equipment T and captured by the corresponding device. According to another embodiment, a mobile equipment T equipped with an infrared light emitter in the manner of a remote control can transmit an optical signal to the multimedia receiver TV in order to verify the proximity of the two devices. The opposite can also be conceived with an emitter integrated in the multimedia receiver and the infrared receiver in the mobile equipment. Once the verifications of the identifiers conformity and proximity have been carried out, the pairing can be established.

According to an embodiment, the multimedia receiver TV can for example generate an encryption key KP derived from the identifier of the mobile equipment TID introduced during the initialization of the pairing by using a predefined cryptographic algorithm. This key KP, also called pairing key, allows creating a secure channel between the two devices, which thus exchange data encrypted with the key. In this case, the pairing request message contains this key which will be registered by the mobile equipment T. During the verification of the pairing, the key KP generated by the multimedia receiver TV is compared with the key transmitted by the response message MR, in addition to the verification of the identifiers. This double verification allows avoiding that unauthorized equipment having captured the pairing key KP in an illegal way can connect to the multimedia receiver.

The pairing between the two devices can be dynamic or static. In a static pairing, the pairing key registered in each of the two devices (TV; T) is unique and constant. It is defined only once after introduction, by the user, of the identifier TID of the mobile equipment T into the multimedia receiver TV and is transmitted to the mobile equipment T with the pairing request message MA.

In a dynamic pairing, the pairing key KP changes during each pairing request of the mobile equipment with the multimedia receiver. For example the generation algorithm uses a different random number at each initialization of a pairing.

A user interface of the application of the multimedia receiver can propose a choice between a static pairing, with permanent key, or dynamic, with ephemeral key.

The pairing key KP can also be derived from an identifier ID of the multimedia receiver TV or from a combination of the identifiers of the multimedia receiver TV and the mobile equipment T. According to another embodiment, the pairing key KP can be arbitrary without dependence of the identifiers on one or the other device to be paired.

The pairing with only the identifier of the mobile equipment can be considered as static without encryption of the data exchanged between the two devices.

According to an embodiment, the pairing request message MA may contain, in addition to the pairing request and the command for acquiring a public address, one or more supplementary parameters such as: a temporary datum like the current date and time and/or a date and hour of expiration of the pairing, an identifier of the multimedia receiver in form of a serial number, or a MAC address (Media Access Control), etc. The mobile equipment T retransmits in the response message MR these supplementary parameters to the multimedia receiver TV for conformity verification.

A digest obtained by the application of an unidirectional hashing function without collision (Hash operation) on every or part of the parameters of the pairing request message MA and of the response message MR can also be included in these messages. This digest is recalculated by the multimedia receiver TV on reception of the response message MR and compared with the digest of the message in order to verify the integrity of the parameters.

A digest can also be calculated on the pairing key for the embodiments where such a key is generated. It may be encrypted with the pairing key KP to form a signature. At the reception of the response message MR, the multimedia receiver TV deciphers the signature with the pairing key KP and compares the digest thus obtained with a digest recalculated by the multimedia receiver TV in order to verify the integrity of the pairing key KP.

Only when the pairing is established according to one of the above described embodiments, the communication between a multimedia receiver TV and the at least one mobile equipment T can be carried out, the multimedia receiver TV being connected to an IP communication network and the mobile equipment T being connected to a mobile communication network using a communication protocol different from that of the IP network. The mobile equipment T exchanges, with the multimedia receiver TV, data packets including the unique public address Ad-pub of said multimedia receiver TV and a unique public address of the mobile equipment T using at least the unique identifier TID of said mobile equipment T. These data packets concern for example a request for display sharing, information and/or contents remainders, links towards Internet sites relative to current received contents, a program guide, etc.

Given that the unique public addresses are known and registered on both sides of the multimedia receiver TV and the mobile equipment T, the communication between these two devices can be indifferently initiated by either of them in condition that they are paired and that an appropriate communication application is activated in the two devices.

The data packets transmitted by the mobile equipment T transit via the mobile network 3G/4G towards the server FI2 of Internet services on mobile network which forwards them through the Internet towards the server FI1 of the IP Internet service provider which transmits it towards the multimedia receiver TV via the router R. The inverted path is followed by the data packets addressed to the mobile equipment T from the multimedia receiver TV. Seen from the user, the two devices communicate with each other as if they were locally connected in a conventional way via a wireless home network WLAN (Wireless Local Area Network) or via a wireless interface of the type Bluetooth or of another type.

The invention claimed is:

1. A method for pairing a multimedia receiver connected to an Internet Protocol (IP) communication network with at least one mobile equipment connected to a mobile communication network using a communication protocol different from the protocol of the IP network, the method comprising:
   receiving a unique identifier of the mobile equipment by an application of the multimedia receiver;
   transmitting, by the multimedia receiver via the IP network, a message to the mobile equipment, the message comprising at least one pairing request and a command for acquiring a unique public address of the multimedia receiver on the IP network, said mobile equipment being identified by an address associated to the unique identifier, the command comprising information enabling determining by a server of an Internet service provider of the IP network said unique public address based on a private address of the multimedia receiver;
   receiving, by the mobile equipment via the mobile communication network, the message and transmitting a response message to the multimedia receiver identified by the unique public address acquired based on the command, said response message comprising at least the unique identifier of the mobile equipment;
   verifying, by the multimedia receiver, the unique identifier of the mobile equipment received in the response message by comparison with the unique identifier previously received by the application; and
   in response to a successful verification, establishing a pairing between the mobile equipment and the multimedia receiver to allow the mobile equipment to exchange data with said multimedia receiver.

2. The method according to claim 1, wherein a proximity verification of the mobile equipment in relation to the multimedia receiver is carried out by an audible or optical signal transmitted from the multimedia receiver to the mobile equipment or transmitted from the mobile equipment to the multimedia receiver.

3. The method according to claim 1, wherein the multimedia receiver generates a pairing key intended to encrypt data exchanged between the mobile equipment and the multimedia receiver, said pairing key being registered in the multimedia receiver and in the mobile equipment.

4. The method according to claim 3, wherein the multimedia receiver transmits the pairing key to the mobile equipment in the pairing request message, said mobile equipment transmitting said pairing key in the response message to the multimedia receiver for conformity verification with the pairing key previously generated.

5. The method according to claim 3, wherein the pairing key is unique and constant.

6. The method according to claim 3, wherein the pairing key changes during each pairing request of the mobile equipment with the multimedia receiver.

7. The method according to claim 3, wherein the pairing key is derived from the identifier of the mobile equipment introduced during the initialization of the pairing by using a predefined cryptographic algorithm or from an identifier of the multimedia receiver or a combination of the identifiers of the mobile equipment and of the multimedia receiver.

8. The method according to claim 1, wherein the pairing request message contains, in addition to the pairing request and the command for obtaining a public address, one or more supplementary parameters comprising the current date and time and/or a date and hour of expiration of the pairing or an identifier of the multimedia receiver.

9. The method according to claim 8, wherein the mobile terminal is selected from the group comprising a mobile phone, smartphone, personal digital assistant and tablet.

10. The method according to claim 1, wherein the pairing request message contains a digest obtained by the application of a unidirectional hashing function without collision on every or part of the parameters of said pairing request message.

11. The method according to claim 10, wherein the mobile equipment in the response message retransmits said digest to the multimedia receiver, said multimedia receiver comparing the digest with a digest recalculated by said multimedia receiver in order to verify the integrity of the parameters.

12. The method according to claim 3, wherein the pairing request message contains a digest obtained by carrying out a unidirectional hashing function without collision on the pairing key, said digest being encrypted with the pairing key to form a signature.

13. The method according to claim 12, wherein the mobile equipment retransmits said signature in the response message to the multimedia receiver, and said multimedia receiver decrypts the signature with the pairing key and compares the obtained digest with a digest recalculated by the multimedia receiver in order to verify integrity of the pairing key.

14. The method of claim 1, wherein the mobile equipment exchanges with the multimedia receiver data packets including the unique public address of said multimedia receiver and a unique public address of the mobile equipment including at least the unique identifier of said mobile equipment.

15. A system comprising:
   a multimedia receiver connected to an IP communication network; and
   at least one mobile equipment connected to a mobile communication network using a communication protocol different from the protocol of the IP network, the multimedia receiver being paired with the mobile equipment;

wherein the multimedia receiver comprises an application associated to a communication interface with the IP network, said application being configured to receive a unique identifier of the mobile equipment received from a user, and to transmit to the mobile equipment a message comprising at least one pairing request and a command for acquiring a unique public address of the multimedia receiver on the IP network, said mobile equipment being identified by an address associated to the unique identifier, the command comprising information enabling determining by a server of an Internet service provider of the IP network said unique public address based on a private address of the multimedia receiver;

wherein the mobile equipment comprises an application configured to transmit, via the mobile communication network, a response message to the multimedia receiver identified by the unique public address acquired based on the command, said response message comprising at least the unique identifier of the mobile equipment; and wherein the application of the multimedia receiver is further configured to verify the unique identifier of the mobile equipment received in the response message by comparison with the unique identifier previously introduced into the application, and, in response to a successful verification, establish a pairing between the mobile equipment and the multimedia receiver to allow the mobile equipment to exchange data with said multimedia receiver.

16. The system according to claim 15, wherein either the mobile equipment or the multimedia receiver is configured to carry out a proximity verification of the mobile equipment in relation to the multimedia receiver by an audible or optical signal transmitted from the multimedia receiver to the mobile equipment or transmitted by the mobile equipment to the multimedia receiver.

17. A multimedia receiver connected to an IP communication network, the multimedia receiver being configured to be paired with at least one mobile equipment connected to a mobile communication network using a communication protocol different from the protocol of the IP network, the multimedia receiver comprising:

a communication interface configured for communication over the IP communication network; and a processor connected to the communication interface and configured to execute an application, to receive a unique identifier of the mobile equipment from a user, to transmit to the mobile equipment a message comprising at least one pairing request and a command for acquiring a unique public address of the multimedia receiver on the IP network, the command comprising information enabling determining by a server of an Internet service provider of the IP network said unique public address based on a private address of the multimedia receiver, said mobile equipment being identified by an address associated to the unique identifier, to receive from the mobile equipment a response message comprising at least the unique identifier of the mobile equipment, to verify the unique identifier of the mobile equipment by comparison with the unique identifier previously introduced into the application and, in response to a successful verification, to establish a pairing between the mobile equipment and the multimedia receiver allowing the mobile equipment to exchange data with said multimedia receiver.

18. A mobile equipment connected to a mobile communication network and configured to be paired with a multimedia receiver connected to an IP communication network using a communication protocol different from the protocol of the mobile communication network, the mobile equipment comprising:

an interface configured for communication over the mobile communication network; and a processor configured to receive via the interface from the multimedia receiver a message comprising at least one pairing request and a command for acquiring a unique public address of the multimedia receiver on the IP network, said mobile equipment being identified by an address associated to a unique identifier previously introduced by a user into the multimedia receiver, the command comprising information enabling determining by a server of an Internet service provider of the IP network said unique public address based on a private address of the multimedia receiver; and transmit, via the mobile communication network, a response message to the multimedia receiver identified by the unique public address on the IP communication network acquired based on the command, said response message comprising at least the unique identifier of the mobile equipment to be verified by the multimedia receiver by comparison with the unique identifier previously introduced into the multimedia receiver, and in response to a successful verification, to establish a pairing between the mobile equipment and the multimedia receiver allowing the mobile equipment to exchange data with said multimedia receiver.

* * * * *